June 22, 1965  S. L. PERRET  3,191,026
PROJECTOR OF RADIATIONS
Filed Oct. 31, 1962

3,191,026
PROJECTOR OF RADIATIONS
Samuel Leon Perret, 24 Rue Matile,
Neuchatel, Switzerland
Filed Oct. 31, 1962, Ser. No. 234,469
1 Claim. (Cl. 240—103)

This invention relates to a projector of radiations, especially luminous rays. This application is a continuation-in-part of the prior application, Serial No. 846,146, filed October 13, 1959 now abandoned.

For a long time, use has been made of parabolic reflectors for the projection of radiations, and especially luminous rays, in particular reflectors whose reflecting surface has the shape of a paraboloid in revolution at the focus of which is the luminous source. However, said source not being pin-point in view of the shape of the reflector, it is difficult to select the rays tending to be parallel to a given direction.

Projectors wherein the radiations from the source are projected on a reflector so designed that practically all radiations are concentrated on one straight focal axis are already known. These projectors have the disadvantage of becoming excessively overheated in the zone of concentrated radiation, which can damage the projector and cause the glass separating the source from the space outside to break. An attempt has thus been made to concentrate the radiations on a focal curve rather than on a straight focal axis.

The projector of radiations according to the invention comprising a source of radiations of the pin-point type and a reflector of elongated shape and having a longitudinal slot from which the radiations issue forth, is characterized in that the reflector comprises a surface adapted to concentrate the radiations along a focal conic located in the symmetry plane of this surface passing through the slot and including the center of the source, sections of the surface through planes perpendicular to the slot being ellipses, the first focuses of the elliptical sections being located on a common conic whose apex coincides with the center of the source, and the second focuses of these elliptical sections being located on said focal conic.

The accompanying drawing shows, by way of non-restrictive example, one embodiment of the projector according to the invention.

Figure 1:
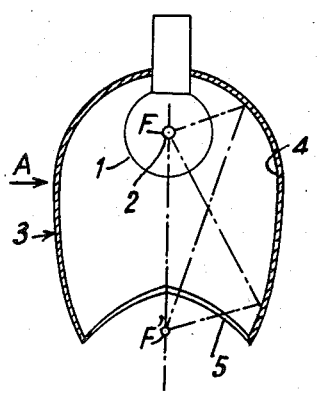
Figure 2:
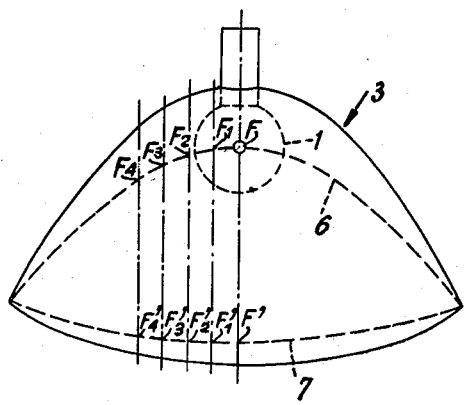
Figure 3:
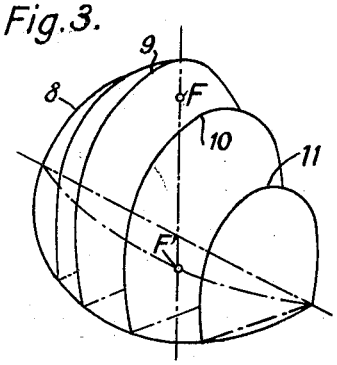
Figure 4:
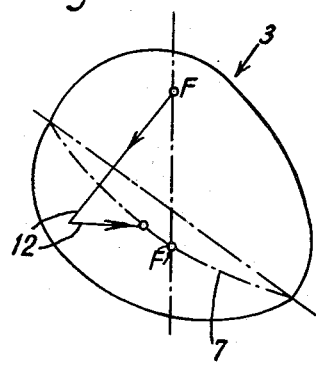
Figure 5:
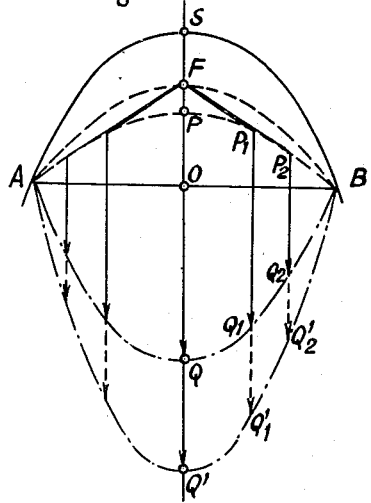
Figure 6:
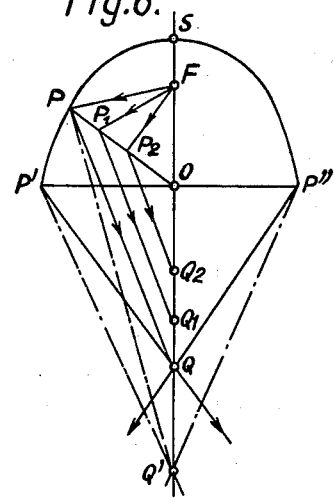

FIG. 1 is a cross-section of this embodiment.
FIG. 2 is a view from arrow A of said FIG. 1.
FIG. 3 is a geometric diagram of this embodiment.
FIG. 4 is a schematic view of this embodiment.
FIGS. 5 and 6 are schematic cross-sections of this embodiment respectively parallel and perpendicular to the slot.

The projector shown in FIGS. 1 to 4 includes a pin-point luminous source made up of a bulb 1 and of a filament 2, and a reflector 3 encircling the source and comprising an internal reflecting surface 4 forming a longitudinal slot 5 through which the rays emitted from the source pass, direct or after reflection on surface 4.

Sections of this surface 4 in planes perpendicular to slot 5 are elliptical. The first focuses of these ellipses, F, $F_1$, $F_2$, $F_3$, are arranged on a parabola 6, the apex of which, constituted by focus F, coincides with the center of the light source, the second focuses of these ellipses, F', $F'_1$, $F'_2$, $F'_3$, ... being located along a focal parabola 7 in the symmetry plane of surface 4 passing through the slot and including the center of the source 1, 2. Certain of these elliptical sections are indicated in the geometrical diagram of FIG. 3 and are designated by reference numerals 8, 9, 10 and 11.

A ray 12 (FIG. 4) emitted from the source and striking a point on surface 4 of the reflector is thus reflected back to parabola 7. All of the rays reflected by this reflector are thus concentrated on this parabola, which avoids the excessive overheating found in the zone of a projector wherein all rays reflected are concentrated on a straight line. With a pin-point source, the reflector reflects the radiations back to the entire length of slot 5 from which they issue forth as a dihedron.

Surface 4 could be constructed in such a way that the elliptical sections have second focuses F', $F'_1$, $F'_2$, ... arranged not on a parabola such as parabola 7, but on any conic.

The example given above concerns luminous radiations. It is obvious that the projector can concentrate other radiations in the same way, i.e. electro-magnetic radiations of various frequencies or sonic radiations.

It can be demonstrated that with the reflector as defined, namely that the elliptical sections have a first series of focuses located on a common conic and a second series of focuses located on said focal conic, the desired result is obtainable, i.e. the reflection of light rays on a conic and not on a straight line, which completely distinguishes this reflector from a reflector in which the elliptical sections comprise a first series of focuses located along the chord common to the parabolic directrices, whereas the positions of the second focuses are not given. The geometric definition of the reflector described takes into consideration the fact that there is an affinity (in the mathematical meaning of the word) between the elliptical and parabolic sections of the reflector, allowing the following conclusions to be drawn:

FIG. 5 is a cross-section of the reflector parallel to the slot, and shows the parabola ASB of apex S and of focus F. FIG. 6 is a cross section perpendicular to the slot and shows the main ellipse P'SP'' of apex S and of focus F, the source being at F. Line AFB (FIG. 5) is the parabola passing through focus F, locus of a series of elliptical section focuses, and line AQB is a parabola which is the locus of the other series of these elliptical sections' focuses.

Rays emanating from F are reflected by the reflector along parabola AQB of vertical plane AFBQ (FIG. 5). If a plane APB is considered, this plane will intersect the reflecting surface along parabola $APP_1P_2 ... B$. Rays emanating from F and striking the reflector along parabola APB are reflected among themselves in a parallel direction and intersect the vertical plane along parabola AQB. The same goes for the rays which strike the edge AP'B of the reflector and which give light dihedron corner angle P'QP'' (FIG. 6).

Obviously, the further parabola apex Q is from straight line AB, the smaller angle P'QP'' is. On the other hand, if Q is the same as O, the corner angle is 180°. Corner angle P'QP'' can thus be determined (and consequently the length of the surface to be illuminated) with applicant's reflector by choosing the parabola which is the locus of the elliptical sections' second focuses.

It is further understood that sending the rays along a cord instead of a conic would be considered within the limits of the case described and claimed in the present patent.

What I claim is:

A projector of radiations, comprising a source of radiations of the pin-point type, a reflector of elongated shape having a longitudinal slot from which the radiation issue, said reflector comprising a surface whose sections are ellipses through planes perpendicular to said slot, the first focuses of all the elliptical sections being located on a first conic whose apex coincides with the center of said source, and the second focuses of said elliptical sections being located on a second conic of the same class as the first and located in the same plane, which is a symmetry plane of the surface passing through said slot and containing the center of said source, whereby said surface concentrates the radiations along said second conic.

References Cited by the Examiner

UNITED STATES PATENTS

| | | | |
|---|---|---|---|
| 1,747,283 | 2/30 | Bean | 240—41.35 |
| 2,186,951 | 1/40 | Bergstrom | 240—41.35 |
| 2,516,377 | 7/50 | Fink | 240—41.1 |
| 2,647,203 | 7/53 | Smith | 240—103 |

NORTON ANSHER, *Primary Examiner.*